United States Patent [19]
Fauvel

[11] 3,984,024
[45] Oct. 5, 1976

[54] COOKING VESSEL

[75] Inventor: Charles Fauvel, Brunoy, France

[73] Assignee: Societe de Vente de l'Aluminium Pechiney, Paris, France

[22] Filed: Aug. 14, 1975

[21] Appl. No.: 604,632

Related U.S. Application Data

[63] Continuation of Ser. No. 381,676, July 23, 1973, abandoned.

[30] Foreign Application Priority Data

July 26, 1972 France .............................. 72.26963

[52] U.S. Cl. ....................... 220/72; 220/74; 220/94 A; 99/426; 206/503; D7/20; D7/85
[51] Int. Cl.² .......................................... B65D 7/44
[58] Field of Search ............... 220/71, 72, 74, 70, 220/DIG. 22, 94 A; 99/422, 417, 418, 425, 372, 426; 206/503; D7/17, 20, 23, 85, 95, 97

[56] References Cited
UNITED STATES PATENTS 3,144,016  8/1964  Basci.................................. 206/499

| D96,504 | /1935 | Rantsch ................. D7/85 |
| D142,041 | /1945 | Shaefer ................. D7/95 |
| D227,141 | /1973 | Gulotta ................. D7/23 |

FOREIGN PATENTS OR APPLICATIONS

| 232,915 | 4/1964 | Austria ............................ 220/72 |
| 525,077 | 12/1953 | Belgium ........................... 220/72 |
| 559,829 | 1960 | Belgium ............................ 220/71 |

Primary Examiner—William Price
Assistant Examiner—Joseph M. Moy

[57] ABSTRACT

A cooking vessel and method for its manufacture wherein the cooking vessel has a thick base and a lateral wall thinner than the base whose inner surface is generated by a straight line, except at its ends, with the vessel, including at the base of the lateral wall a large external collar whose outer surface is generally V-shaped with the lower arm of the V developing a conical surface joined to the base and the upper arm, by which it is connected to the lateral wall, being curved outwardly.

2 Claims, 7 Drawing Figures

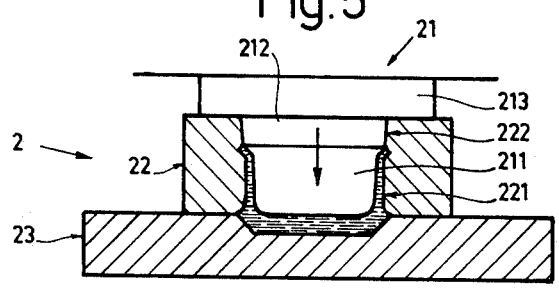
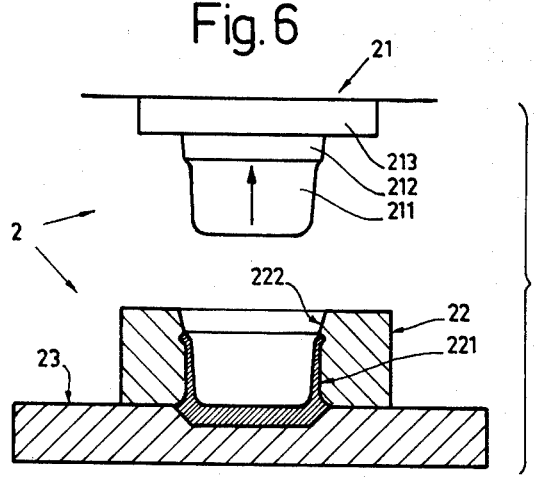
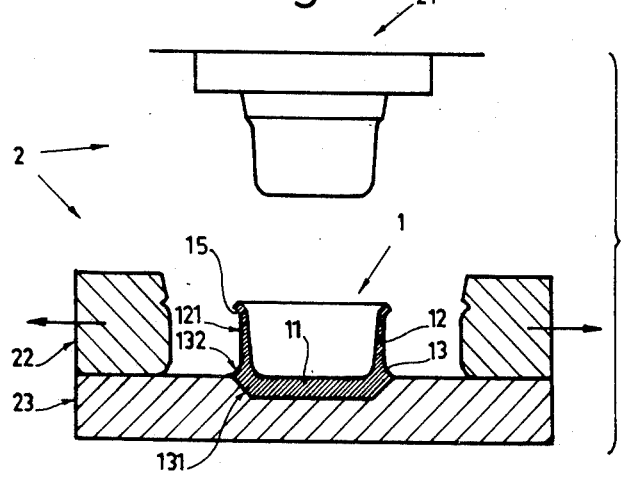

COOKING VESSEL

This is a continuation of application Ser. No. 381,676, filed July 23, 1973, now abandoned.

This invention relates to a domestic cooking vessel of a new form, and to the application of a casting process developed for its production.

The shape of conventional domestic cooking vessels such as casseroles, frying pans, braising pans, is governed by the processes by which they are manufactured, with the result that these utensils have to be given one of a number of possible forms rather than the optimum form for the particular use intended. Accordingly, vessels of various types have to be produced by various processes, each type being ideally adapted to a greater or lesser extent to the foods to be cooked and to the cooker used.

Stamping gives rise to uniform, constant thicknesses and to an absence of relief.

It is possible by flowturning to obtain variable thicknesses localized over part of the periphery, the thicknesses remaining radially constant.

Chasing only enables vessels of necessarily constant thickness to be obtained.

Die stamping/drop forging has more possibilities, although it is complicated and expensive due to the fact that it necessitates several operations carried out in different dies to obtain a single component.

Casting in destructible molds does not enable sufficiently narrow thicknesses to be obtained. On the other hand, the surface obtained is relatively coarse.

Gravity die casting enables a better surface to be obtained although it is still not satisfactory. However, it is not possible in this case either to obtain a lateral wall of narrow thickness.

Casting under pressure is the only casting process by which it is possible to obtain a satisfactory surface. By contrast, it does not enable an adequate contrast in thickness to be obtained between thin and thick parts. In addition, the presence of the large bulge which corresponds to attachment of the handle to a wall of limited thickness increases the danger of blisters, blowholes or internal shrinkage holes appearing.

In practice, it is possible to buy, on the other hand, inexpensive containers obtained by stamping, of limited constant thickness, which are suitable for gas cookers and, on the other hand, containers obtained by casting of considerable weight and thickness intended to be used on electrical cookers.

In containers of the first kind, the handle is generally attached by rivets which are unable to withstand repeated thermal stressing, with the result that the base is soon buckled. In containers of the second type, the handle is occasionally attached in one piece during casting, the base is thick and remains flat, but the lateral wall has an unnecessarily large thickness.

In both cases, the outer surface of the lateral wall deteriorates under the effect of heat, under the effect of an overlapping flame or under the effect of rising hot air, and the definition of the polished or enamelled lateral wall in relation to the base is both difficult and unsightly in appearance.

It is accordingly an object of the present invention to overcome the foregoing disadvantages, and it is a more specific object of the invention to provide a lightweight cooking vessel whose base does not buckle and whose lateral wall is both protected against the direct action of hot gases and defined in relation to the base.

It is a further object of the invention to provide a casting for the production of cooking vessels in this invention.

These and other objects and advantages will appear more fully hereinafter and, for purposes of illustration but not of limitation, an embodiment of the invention is shown in the accompanying drawings wherein:

FIG. 5 is a view of the assembly of FIGS. 3 and 4 in which the punch has been lowered into the die for molding/die stamping;

FIG. 6 is a view of the assembly of FIGS. 3–5 in which the punch has been withdrawn from the die; and FIG. 7 illustrates the assembly of FIGS. 3–6 in which the cooking vessel has been removed from the mold.

The vessel according to the invention comprises a thick base. It also comprises a lateral wall whose upper part is of limited thickness and whose lower part is externally reinforced in the form of a V, the lower arm of this V developing a conical surface connected to the base, its outer arm by which it is joined to the upper part of the lateral wall being curved, the concavity of this curve being directed outwards.

The inner surface of the lateral wall is a surface of revolution generated by a line without any break in continuity, except at its apex. Examples of lines without any break in continuity include a straight line, a parallel line or an oblique line in relation to the axis of symmetry, or a curved line, all of whose sections have a large radius of curvature.

The lateral wall is generally provided on its upper part with at least one bulge for attaching a handle.

The vessel is obtained by molding/die stamping, i.e. by injecting liquid metal or alloy into a die and compressing this metal by means of a punch descending into the die until the space between these two components corresponds to the shape of the vessel to be obtained.

Figure 1:
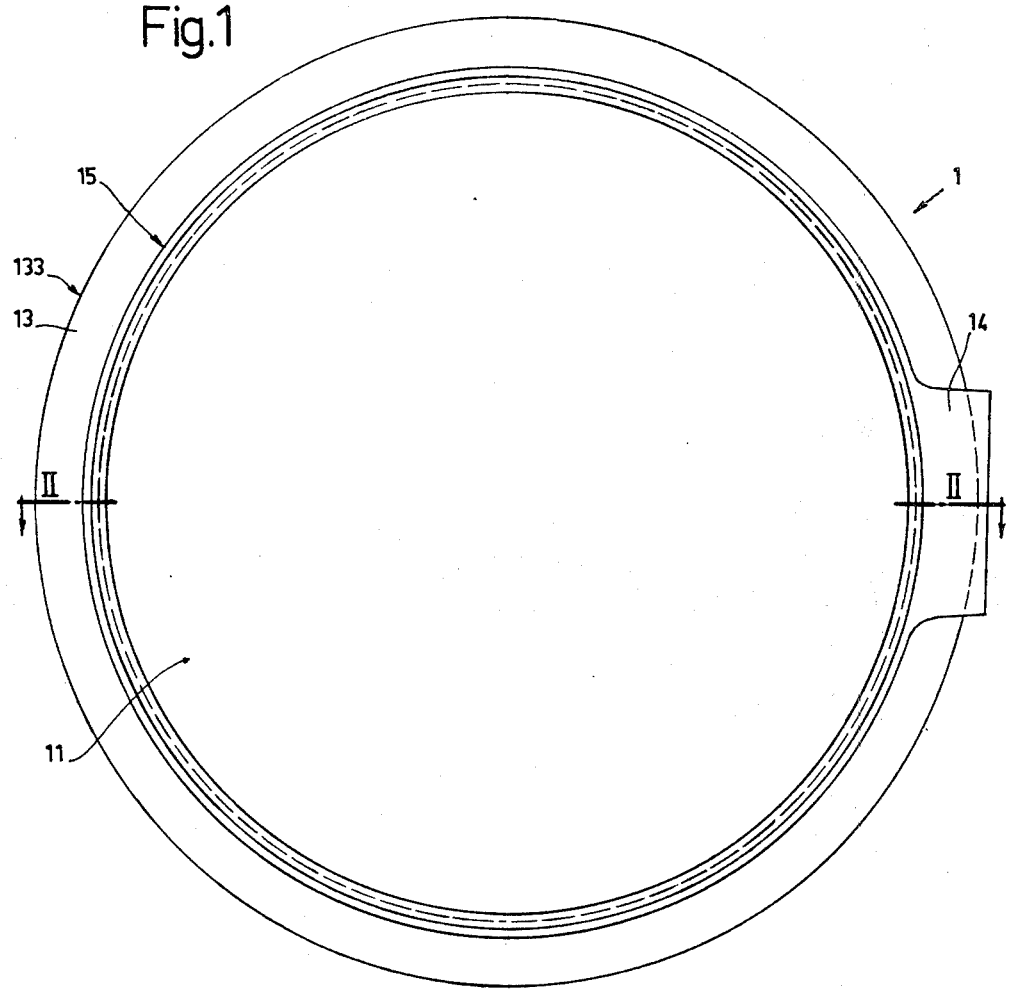
FIG. 1 is a plan view of a cooking vessel embodying the features of this invention.
Figure 2:
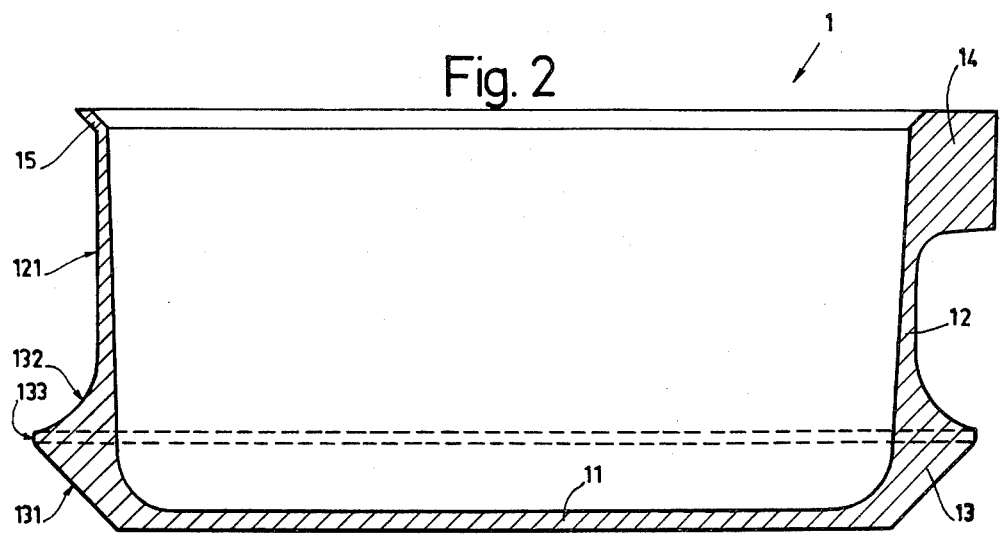
FIG. 2 is a sectional view taken along the lines II-II of FIG. 1.

The vessel shown in FIGS. 1 and 2 is a casserole, although the forms below apply equally well to frying pans or braising pans.

The casserole 1 comprises a base 11 with a constant thickness greater than that of stamped casseroles, but narrower than that of casseroles cast by the conventional method, and a lateral wall 12 of lesser thickness having a slight relief of the order of 1° to 5°. The thickness of this lateral wall can be constant or can decrease in the upward direction. The base is connected to the lateral wall through a V-shaped collar 13. At its upper end, the lateral wall is provided on the one hand with a frustoconical portion 15 and, on the other hand, with a bulge 14 intended for attaching a handle. When the vessel is a braising pan, the lateral wall comprises two bulges arranged in one plane of symmetry of the vessel.

The dimensions of the collar are important. In the case of casseroles, the apex of the collar exceeds by 10 to 12 mm the perpendicular of the outer surface 121 of the lateral wall 12. As already explained, its section through an axial plane is V-shaped. The lower arm 131 of the V is formed by a straight line inclined at 45° to the base, while its upper arm is formed by an arc 132 with a radius of 15 mm forming a tangent to the outer surface 121 of the lateral wall. A cylindrical portion 133 of reduced height (1 to 2 mm) can be provided at the apex of the collar.

This form promotes protection of the coating optionally applied to the outer surface 121 of the lateral wall 12 by enamelling, polishing, anodizing, "teflonizing" or the like, and enables the aesthetic appearance of the casserole to be maintained, even after numerous heating cycles.

The upper frustoconical section 15 facilitates pouring and enables the various parts of a standard set of five casseroles to fit inside one another to form a stable stack.

By way of example, a so-called 20 cm casserole has a diameter of 220 mm at the apex of the collar. At midheight, the diameter amounts to 200 mm, as measured on the outer surface 121 of the lateral wall 12, the overall height amounting to 100 mm and the thickness of the base to 4.2 mm. The internal diameter at the base of the upper frustoconical section 15 amounts to 196 mm, and the thickness of the lateral wall 12 varies from 3 mm at its junction with the collar 13 to 1.8 mm at the bottom of the frustoconical section 15.

This vessel cannot be produced by conventional methods. Accordingly, it has to be produced by a molding/die stamping process which, although known per se, has only ever been used for totally different purposes.

In this process, a liquid metal or alloy is poured into the lower part of a metal mold 2 comprising a die 22-23 and a punch 21, and is subjected to compression by lowering the punch into the die. Under the effect of this compression, applied to the punch by a vertical press (not shown), the metal is forced to enter the cavity between the punch and the die.

The die comprises a base 23 fixed to the table of the press, and lateral copes 22 arranged on the base. These copes are designed to be displaced laterally outwardly during mold release (see FIG. 7). The punch 21 is fixed to the movable plate of the press accurately centered with respect to the die.

The base 23 is recessed at 231 to reproduce that part of the outer surface of the vessel to be produced which is situated below the cylindrical section 133 of the collar 13. The assembly formed by the lateral copes 22 reproduces on its inner wall 221 the upper part of the outer surface of the vessel so as to form, in conjunction with the recessed part of the base, an impression reproducing the outer surface. Above its wall 221, the cope assembly also comprises a frusto-conical section 222.

The punch 21 comprises a lower section 211 reproducing the inner surface of the vessel and surmounted by a frusto-conical section 212 designed to ensure fluidtight contact when the mold is closed, with the frustoconical section 222 of the inner wall of the copes 22, even under high pressures. The punch is completed by a support 213.

A heating system is preferably provided in the central zone of the base 23. In addition, this central zone and the other parts of the mold can be provided with a cooling system for controlling heat transfer between the liquid metal and the walls of the mold.

Figure 3:
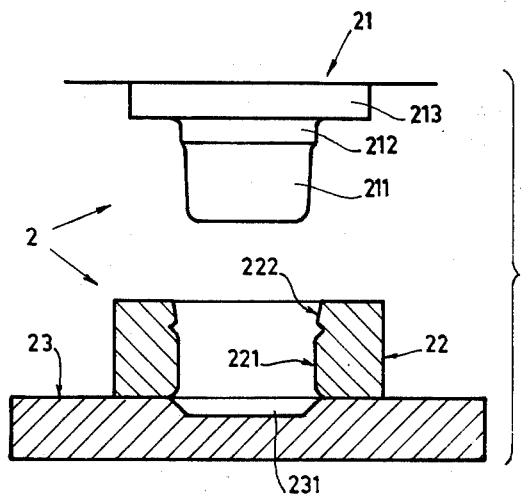
FIG. 3 is a partial section of the molding/die stamping assembly which is open and empty.

The apparatus functions as follows:

At the beginning of the operation, the apparatus is in the position illustrated in FIG. 3. The punch is released and the copes are in the molding position, i.e. closed. The stroke of the movable press plate is adjusted in dependence upon the height of the mold and upon the volume of the vessel to be obtained. A refractory dressing is applied to those parts of the apparatus intended to come into contact with the metal to be molded. This refractory dressing can consist of a graphite-containing cream to which a layer of powdered graphite is applied by spraying. In cases where the alloy to be molded is based on aluminum and magnesium, it is also possible to use a refractory dressing containing graphite and aluminum powder.

Figure 4:
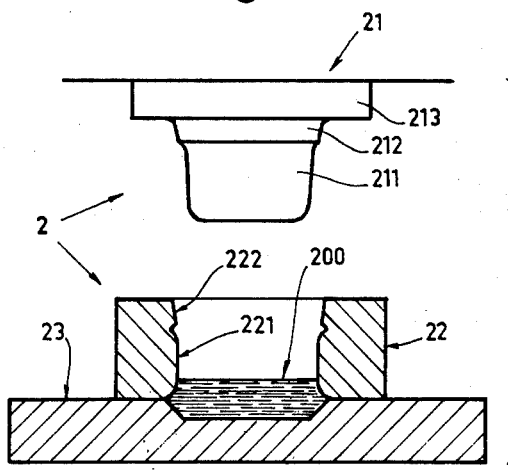
FIG. 4 is the assembly shown in FIG. 3 with the liquid metal in place.

The next stage (FIG. 4) comprises injecting a measured quantity 200 of liquid metal or alloy treated beforehand with a flux, after which the punch is lowered until the closure formed by the frustoconical sections 212 and 222 of the punch and the copes is perfectly fluidtight.

After cooling, the punch 21 is withdrawn, as shown in FIG. 6, after which the copes are laterally displaced, as shown in FIG. 7. All that remains is to remove the finished casserole 1.

The base must be perfectly horizontal to prevent the metal from following a preferential course in the cavity during descent of the punch. The mold used comprises a base with a removable bottom section comprising the recess 231. The tooling as a whole is made for example of 5% chrome steel with a hardness of 50, as measured by the so-called Rockwell C method. The punch and the removable bottom section of the base can be made of hardened and tempered copper-beryllium alloy which considerably increases the service life of the tooling.

A so-called 18 cm casserole with the following dimensions is considered by way of example:

| | |
|---|---|
| External diameter at mid-height | 180 mm |
| Internal diameter at the base of the pouring spout | 176 mm |
| Overall external height | 90 mm |
| Thickness of base | 3.8 mm |
| Minimal thickness of the lateral wall | 2.5 mm |
| Inner relief | 2° |
| Height of collar apex | 16 mm |
| External diameter at collar apex | 200 mm |
| Volume of liquid metal injected | 430 cc |

The press used has a rating of 2000 kilonewtons, the final pressure applied to the metal amounting to 650 bars. The rate of descent of the punch varies from 2 to 4.50 meters per minute. Depending on the alloy used, the production cycle between two consecutive articles amounts to between 25 and 45 seconds.

The aluminum alloys used by way of example are as follows:
 a. A-S 13, containing 13% of silicon,
 b. A-S 5, containing 5% of silicon,
 c. A-S 7 Ti, containing 7% of silicon, 0.25% of titanium, 0.8% of iron and 0.30% of manganese,
 d. A-G 6 S, containing 6% of magnesium and 0.8 to 1% of silicon,
 e. A-G 10 Be, containing 10% of magnesium and 0.04% of beryllium.

The type of flux used, the temperatures of the liquid metal injected and of the tooling, and the degrees of hardness obtained, as measured by the so-called Brinell H method, in which a 10 mm ball is applied for 30 seconds under a load of 10,000 newtons, are set out in the following Table for each of these alloys.

It is pointed out that a washing flux consists of a mixture of alkali chlorides, occasionally containing additions of fluorides or of cryolite. The following is one example of a suitable composition: 45% of potassium chloride, 45% of sodium chloride, 10% of the double fluoride of aluminum and sodium ($AlF_3 \cdot 3$ NaF). These fluxes occasionally have grain refinement products added to them, such as titanium, boron (in alloys b and c). The carnallite used for the magnesium alloys is a double chloride of magnesium and potassium ($MgCl_2 \cdot KCl$).

Inserts made of a metal different from that which is being cast can be introduced into the mold.

TABLE

| Alloy | Flux | Temperatures °C | | | | HB Hardness |
|---|---|---|---|---|---|---|
| | | Casting | Die base | Die | Punch | |
| a | washing | 740 to 810 | 380 to 480 | 340 to 380 | 350 to 400 | 66 |
| b | titanium | 730 to 830 | 400 to 490 | 340 to 380 | 360 to 410 | 60 |
| c | titanium and boron | 730 to 800 | 380 to 430 | 340 to 370 | 380 to 420 | 60 |
| d | carnallite | 760 to 790 | 360 to 460 | 320 to 340 | 360 to 380 | 70 |
| e | carnallite and gas extractant | 760 to 790 | 340 to 420 | 320 to 340 | 360 to 380 | 90 |

It is possible by this process to produce the vessel in a single operation which is readily automated. In addition, there is no loss of starting material, all the material injected being used without any droppings. The result is a considerable saving both of labor and of starting material.

It is currently the only process by which it is possible directly to obtain in a single operation high-quality forms comprising heavily reduced thicknesses, for example vessels having a 1.5 mm lateral wall and a 5 mm base. It can be readily applied both to aluminum and to numerous alloys of this metal, such as hypo- and hyper-silicon alloys, magnesium alloys, and other alloys.

The invention can be used for the production of a new type of cooking vessel.

I claim:

1. A domestic cooking vessel with a thick base and a lateral wall thinner than the base and whose inner surface is generated by a straight line, except at its ends, wherein the vessel comprises at the base of the lateral wall a large external collar whose outer surface is generally V-shaped, the lower arm of this V defining a conical surface joined to the base, the upper arm by which it is connected to the lateral wall being curved, the concavity of this curve being directed outwards, said lateral wall terminating at its upper end in a conical section having a taper corresponding to the taper of the lower conical surface of the collar, with the collar being integral with and having a thickness greater than the thickness of the side walls whereby the external collar can be stacked on the conical wall and the collar serves to dissipate heat from the lateral walls of the vessel and to promote protection of the coating optionally applied to the outer surface of the lateral wall.

2. A cooking vessel as claimed in claim 1 comprising, on the upper part of its lateral wall, at least one bulge for fixing at least one handle.

* * * * *